J. CARLBERG.
PROCESS OF ATTACHING MARBLE AND OTHER SLABS TO WALLS.
APPLICATION FILED MAY 22, 1911.
1,054,744. Patented Mar. 4, 1913.
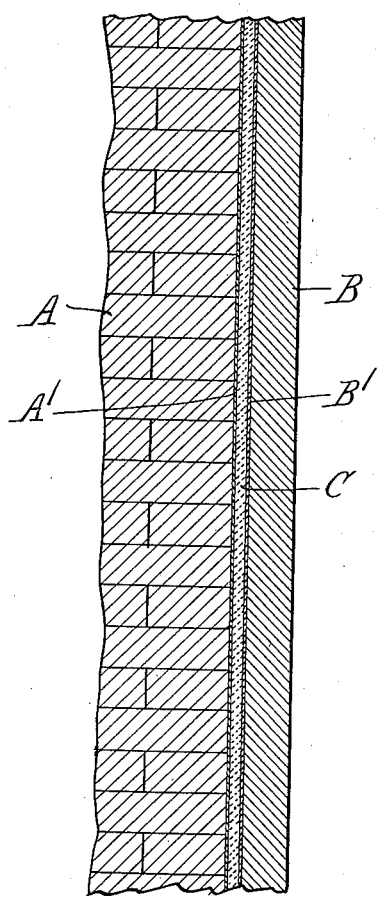
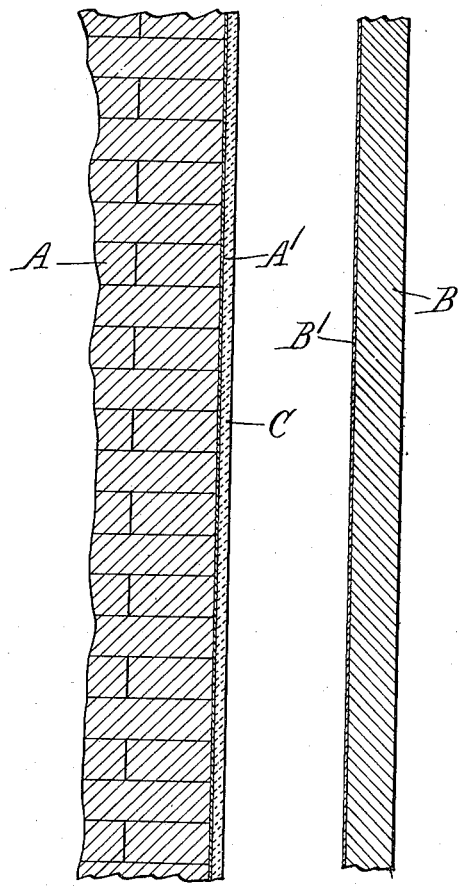
Witnesses,
Edward T. Wray.
Minnie M. Lindeman
Inventor.
John Carlberg.
by Parker & Carr
Attorneys.

UNITED STATES PATENT OFFICE.

JOHN CARLBERG, OF CHICAGO, ILLINOIS.

PROCESS OF ATTACHING MARBLE AND OTHER SLABS TO WALLS.

1,054,744.     Specification of Letters Patent.     Patented Mar. 4, 1913.

Application filed May 22, 1911. Serial No. 628,867.

*To all whom it may concern:*

Be it known that I, JOHN CARLBERG, a subject of the King of Sweden, residing at Chicago, in the county of Cook and State of Illinois, have invented a certain new and useful Improvement in Processes of Attaching Marble and other Slabs to Walls, of which the following is a specification.

My invention relates to improvements for fastening porous objects such as stone, wood and the like to walls.

In the accompanying description while I have referred specifically to the attaching of stone or marble to walls it will be evident that my invention need not be limited in its use and scope to stone and marble alone or to the attaching of slabs to walls.

My invention is illustrated diagrammatically in one form in the accompanying drawing, wherein—

Figure 1 is a sectional view through a wall showing a slab attached thereto by my process; Fig. 2 is a sectional view of a wall before the slab is applied; Fig. 3 is a sectional view through a slab before being applied to the wall.

The wall A may be of brick-wall masonry as indicated, and has applied to it the comparatively thin gum arabic coating $A^1$. The slab B has applied to it the comparatively thin gum arabic coating $B^1$. The cement backing C is applied to the gum arabic coating $A^1$ of the wall and leveled off to receive the coated side of the slab B.

It will be evident that while I have shown in my drawings an operative device, still many changes might be made in size, shape and arrangement without departing materially from the spirit of my invention.

In the preferred form of my invention, when it is desired to apply or attach marble or stone to a porous wall, such as the ordinary brick or masonry wall in a building or house, I first coat the wall itself with a thin solution of gum arabic in water. Then I treat the back side of the slab in the same manner. I then build up a backing of cement on the wall or the slab or both placing it upon the coated surface and leveling it off before applying the coated side of the slab thereto. The whole is allowed to set, and the slab will then be found to be firmly attached to the wall.

The cement that I preferably use is the well-known Keen cement which may be used with the addition of powdered gum arabic, and is made up into a paste with the addition of water. The function of the gum arabic coating on the wall and the slab is to retain for a time within the cement the moisture or water which is used in its mixture, and which would otherwise be drawn out of it into the porous wall and the porous slab, discoloring the front of the slab, and causing the cement to dry without setting. The gum arabic is soluble in water, but until it has been dissolved forms an impervious coating, the result of this is that the water is retained in the cement long enough to be used up by the chemical processes which ensue as the cement sets, but before this process is completed and while it is taking place, the gum arabic is gradually absorbed in some manner into the cement, and the cement or composition finally becomes attached directly to the opposed surfaces of the objects to be held together. The addition of the gum arabic to the cement is to prevent the too rapid setting of the cement and by holding the water in it to supplement the action of the gum arabic coating and give the cement time to set gradually and evenly. There is of course, the possibility that there may be some coating substances other than gum arabic which might equally well be applied, and that some other cement other than Keen cement, mixed with some substance other than gum arabic, and with some liquid other than water, might equally well be used, since all that is required is that the opposed surfaces of the objects which are to be joined be coated with a covering of some impervious material which may be gradually absorbed into the body of the cement and that the cement itself be mixed with any suitable hygrometric material which will not interfere with the strength of the cement.

In preparing the mixtures for my process, I preferably use a pure solution of gum arabic and water for coating the surfaces to be attached, and in preparing the cement I may use a mixture of from 1 to 20% gum arabic, the remainder being Keen cement, or may leave out the gum arabic entirely, the proportion of gum arabic in the cement varies with the absorptive capacity of the wall or objects to be attached together and the more likely the objects are to absorb water, the more gum arabic there should be applied.

It will of course be evident that while I have described a definite and distinct operative process, there may possibly be other ingredients that might be used and which would operate in the same way, without departing materially from the spirit of my invention, and I wish therefore, that it be understood that what I have described is merely the preferred form and that it is of course, not by any means the only form and it is quite possible that under other circumstances and conditions some other ingredients might even be found preferable, but for the present my experiment and experience lead me to believe that what I have described is the best type.

I claim:

1. The process of attaching together porous substances which consists in coating their opposed surfaces with a composition impervious to water and applying to said coated surfaces a cement mortar in which the impervious composition is soluble.

2. The process of attaching together porous substances which consists in coating their opposed surfaces with a solution of gum arabic and then applying to said coated surfaces a cement mortar in which the gum arabic is soluble.

3. The process of attaching together porous substances which consists in coating their opposed surfaces with a composition impervious to water and applying to said coated surfaces a cement mortar in which the impervious composition is soluble, said cement mortar being made up of a mixture of Keen cement and powdered gum arabic.

4. The process of attaching together porous substances which consists in coating their opposed surfaces with a solution of gum arabic and then applying to said coated surfaces a cement mortar in which the gum arabic is soluble, said cement mortar being made up of a mixture of Keen cement and powdered gum arabic.

JOHN CARLBERG.

Witnesses:
FRANCIS W. PARKER, Jr.,
SOPHIE B. WERNER.